United States Patent
Hongo (10) Patent No.: US 9,438,069 B2
(45) Date of Patent: Sep. 6, 2016

(54) VEHICLE-MOUNTED CHARGER (71) Applicant: PANASONIC CORPORATION, Osaka (JP)

(72) Inventor: Hiromi Hongo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 14/363,173

(22) PCT Filed: Dec. 5, 2012

(86) PCT No.: PCT/JP2012/007803
§ 371 (c)(1),
(2) Date: Jun. 5, 2014

(87) PCT Pub. No.: WO2013/084488
PCT Pub. Date: Jun. 13, 2013

(65) Prior Publication Data
US 2014/0347009 A1 Nov. 27, 2014

(30) Foreign Application Priority Data
Dec. 7, 2011 (JP) .................. 2011-267954

(51) Int. Cl.
*H02J 7/02* (2016.01)
*H02J 17/00* (2006.01)
*H02J 7/00* (2006.01)

(52) U.S. Cl.
CPC .............. *H02J 7/025* (2013.01); *H02J 7/0044* (2013.01); *H02J 17/00* (2013.01); *H02J 50/10* (2016.02);
(Continued)

(58) Field of Classification Search
CPC .......... H02J 7/025; H02J 50/10; H02J 50/90; H02J 7/0044; H02J 17/00; H02J 7/0047; H02J 7/0052; H02J 2007/0095
See application file for complete search history.

(56) References Cited

U.S. PATENT DOCUMENTS

| 5,677,614 A | 10/1997 | Ohmori et al. | |
| 7,880,338 B2 * | 2/2011 | Jin | H02J 5/005 307/104 |

(Continued)

FOREIGN PATENT DOCUMENTS

| JP | 9-37478 | 2/1997 |
| JP | 2007-74784 | 3/2007 |

(Continued)

OTHER PUBLICATIONS

International Search Report issued Feb. 19, 2013 in International Application No. PCT/JP2012/007803.

(Continued)

*Primary Examiner* — Naum B Levin
(74) *Attorney, Agent, or Firm* — Wenderoth, Lind & Ponack, L.L.P.

(57) ABSTRACT

A vehicle-mounted charger which performs wireless charging includes a control unit which controls energization of a primary coil, a position detection unit which detects a positional relationship between the primary coil and a secondary coil of an apparatus to be charged such as a mobile phone, and a notification unit which performs notification to the user. In a state where the energization of the primary coil is not performed, the control unit acquires the positional relationship between the primary coil and the secondary coil which is detected by the position detection unit, and controls the notification unit to notify of the positional relationship.

4 Claims, 10 Drawing Sheets (52) U.S. Cl.
CPC .............. *H02J 50/90* (2016.02); *H02J 7/0047* (2013.01); *H02J 7/0052* (2013.01); *H02J 2007/0095* (2013.01)

(56) References Cited

U.S. PATENT DOCUMENTS

| | | | | |
|---|---|---|---|---|
| 8,373,310 | B2* | 2/2013 | Baarman | H01F 38/14 307/104 |
| 8,825,118 | B2* | 9/2014 | Kim | H02J 7/0047 455/41.1 |
| 2005/0131486 | A1* | 6/2005 | Boveja | A61N 1/08 607/40 |
| 2008/0001572 | A9* | 1/2008 | Baarman | H01F 5/02 320/108 |
| 2008/0111518 | A1 | 5/2008 | Toya | |
| 2008/0224655 | A1 | 9/2008 | Tilley et al. | |
| 2009/0021211 | A1 | 1/2009 | Zhang et al. | |
| 2009/0153098 | A1 | 6/2009 | Toya et al. | |
| 2010/0201315 | A1* | 8/2010 | Oshimi | H02J 7/025 320/108 |
| 2011/0221387 | A1* | 9/2011 | Steigerwald | B60L 11/182 320/108 |
| 2011/0241440 | A1 | 10/2011 | Sakoda et al. | |
| 2012/0052923 | A1* | 3/2012 | Park | H02J 7/025 455/567 |
| 2012/0313577 | A1* | 12/2012 | Moes | H04B 5/0037 320/108 |

FOREIGN PATENT DOCUMENTS

| | | |
|---|---|---|
| JP | 2008-178234 | 7/2008 |
| JP | 2008-206295 | 9/2008 |
| JP | 2009-213295 | 9/2009 |
| JP | 2009-247194 | 10/2009 |
| JP | 2010-130729 | 6/2010 |
| JP | 2010-141976 | 6/2010 |
| JP | 2010-183757 | 8/2010 |
| JP | 2011-244624 | 12/2011 |

OTHER PUBLICATIONS

Extended European Search Report issued Sep. 30, 2014 in corresponding European patent application No. 12 85 4695.

* cited by examiner

| DESCRIPTION OF FLAG | | | |
|---|---|---|---|
| NAME OF FLAG | CONDITION FOR SETTING 1 | CONDITION FOR SETTING 0 | PURPOSE OF USE |
| CHARGE END FLAG | FULL CHARGE | MOBILE PHONE IS DETACHED FROM CHARGER | TO STOP CHARGING AT FULL CHARGE |
| SECONDARY COIL DETECTION FLAG | PLACING OF MOBILE PHONE ON CHARGER IS DETECTED | MOBILE PHONE IS DETACHED FROM CHARGER | TO LIMIT EMISSION OF FIRST PREDETERMINED SOUND AT DETECTION OF MOBILE PHONE, TO FIRST ONE TIME |
| CHARGE START FLAG | DETERMINING THAT CHARGE IS COMPLETED | DETERMINING THAT CHARGE IS NOT COMPLETED | TO EMIT FOURTH PREDETERMINED SOUND ALSO IN CASE WHERE POSITION OF MOBILE PHONE IS ONCE DEVIATED FROM CHARGEABLE POSITION, AND THEN AGAIN MOVED TO CHARGEABLE POSITION |

VEHICLE-MOUNTED CHARGER

BACKGROUND OF THE INVENTION

1. Technical Field

The present invention relates to a vehicle-mounted charger which performs wireless charging.

2. Description of the Related Art

Recently, the power consumption of a mobile phone has been increased with enhancement of the performance of the mobile phone, and it is requested to charge such a mobile phone also in a vehicle. Moreover, also the practical use of wireless charging using electromagnetic induction has been advanced.

In the field of a wireless charger, a technique is known in which the relative position of a primary coil for power transmission and a secondary coil for power reception is detected by comparing the voltage generated in the secondary coil with a reference voltage (for example, see JP-A-2008-206295).

SUMMARY OF THE INVENTION

1. Technical Problem

In the case where the above-described wireless charger is mounted on a vehicle, when a charging coil functioning as the primary coil of the wireless charger is energized, the reliability of the vehicle control such as the keyless entry control for controlling the opening and closing of a door is lowered by an electromagnetic wave emitted from the charging coil. Therefore, it may be contemplated that the energization of the charging coil is limited. However, there is a problem in that, during a period when the charging coil cannot be energized, the relative position of the primary coil power transmission and the secondary coil for power reception cannot be detected, and usability is very poor.

Specifically, just after the user gets into the vehicle, the keyless entry control and the like are conducted, and therefore the wireless charger cannot perform the positional alignment between the primary coil and the secondary coil. Namely, unless the vehicle is in a state where the keyless entry control is not conducted, such as that where the vehicle is driven, the wireless charger cannot perform the positional alignment between the primary coil and the secondary coil. Unless the vehicle is in a state where the keyless entry control is not conducted, such as that where the vehicle is driven, therefore, the wireless charger cannot prepare for starting the charging operation. As described above, the operation limitation of the wireless charger according to the state of the vehicle is not preferable in the viewpoint of usability.

It is an object of the invention to provide a vehicle-mounted charger in which usability is improved.

2. Solution to Problem

According to an aspect of the invention, a vehicle-mounted charger performs wireless charging, wherein the charger includes a control unit which controls energization of a primary coil, a position detection unit which detects a positional relationship between the primary coil and a secondary coil of an apparatus to be charged, and a notification unit which performs notification to a user, and, in a state where the energization of the primary coil is not performed, the control unit acquires the positional relationship between the primary coil and the secondary coil which is detected by the position detection unit, and controls the notification unit to notify of the positional relationship.

3. Advantageous Effects of Invention

According to another aspect of the invention, the vehicle-mounted charger includes the control unit which controls energization of the primary coil, the position detection unit which detects the positional relationship between the primary coil and the secondary coil of the apparatus to be charged, and the notification unit which performs notification to the user, and the control unit acquires positional relationship between the primary coil and the secondary coil in the state where the energization of the primary coil is not performed which is detected by the position detection unit, and controls the notification unit to notify of the positional relationship. Therefore, the vehicle-mounted charger is very excellent in usability.

According to another aspect of the invention, in the vehicle-mounted charger, even when the keyless entry control is conducted just after the user gets into a vehicle, namely, the positional alignment between the primary coil and the secondary coil can be performed. As soon as the user gets into the vehicle, therefore, the charger can prepare for starting an operation of charging the apparatus to be charged which is placed at a position where the charging operation is enabled. When the influence on the vehicle control is then eliminated and a chargeable state is attained, the vehicle-mounted charger can immediately start the charging operation. Therefore, the vehicle-mounted charger is very excellent in usability.

DETAILED DESCRIPTION OF THE INVENTION

Hereinafter, an embodiment of the invention will be described with reference to the drawings.

Figure 1:
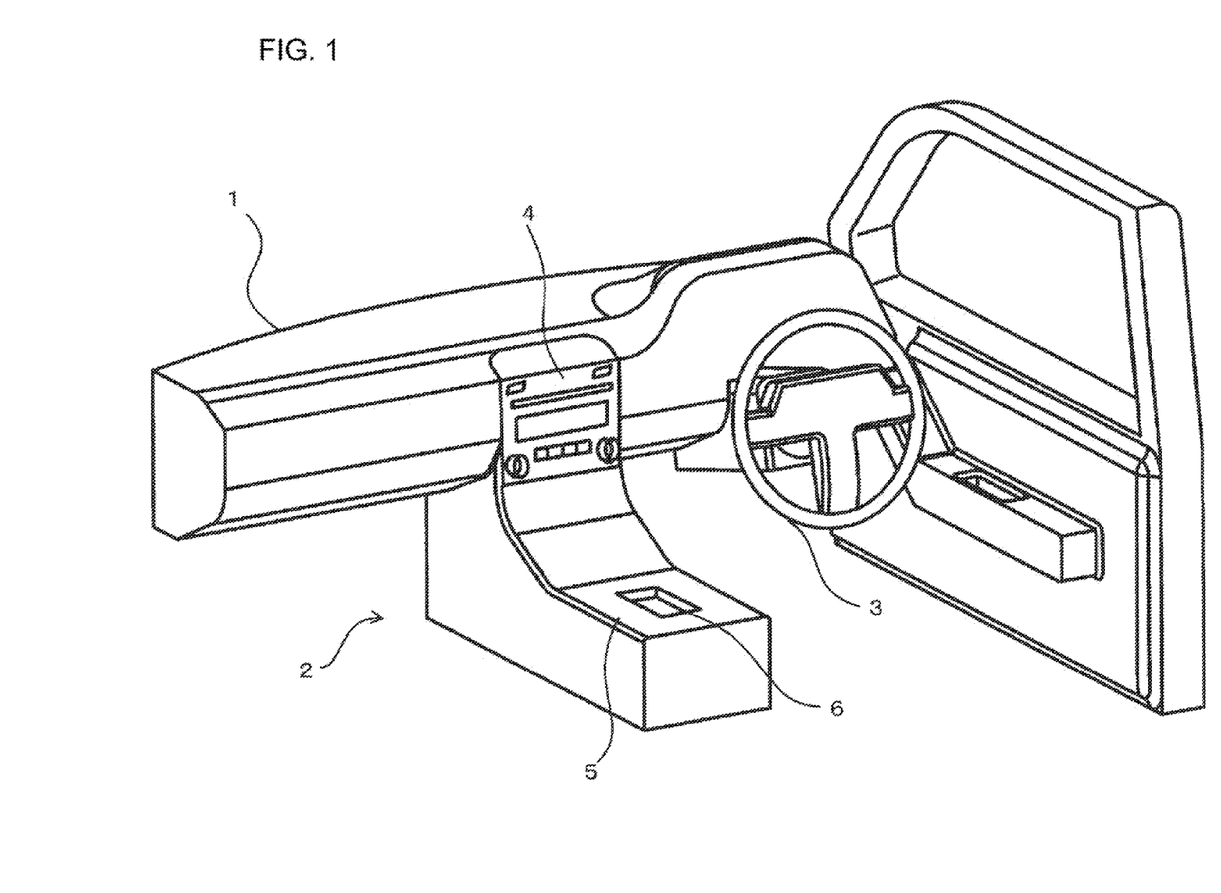
FIG. 1 is a view showing a state where a vehicle-mounted charger of an embodiment of the invention is mounted in a vehicle.

FIG. 1 is a view showing a state where a vehicle-mounted charger of an embodiment of the invention is mounted in a vehicle. As shown in FIG. 1, a steering wheel 3 is placed in a front portion of the interior 2 of the vehicle 1, and a vehicle-mounted electronic apparatus 4 is placed on the left side of the steering wheel 3. Furthermore, a vehicle-mounted charger 5 which can perform wireless charging on an electronic apparatus such as a mobile phone is placed below the vehicle-mounted electronic apparatus 4 and between the driver seat and the front passenger seat.

Figure 2:
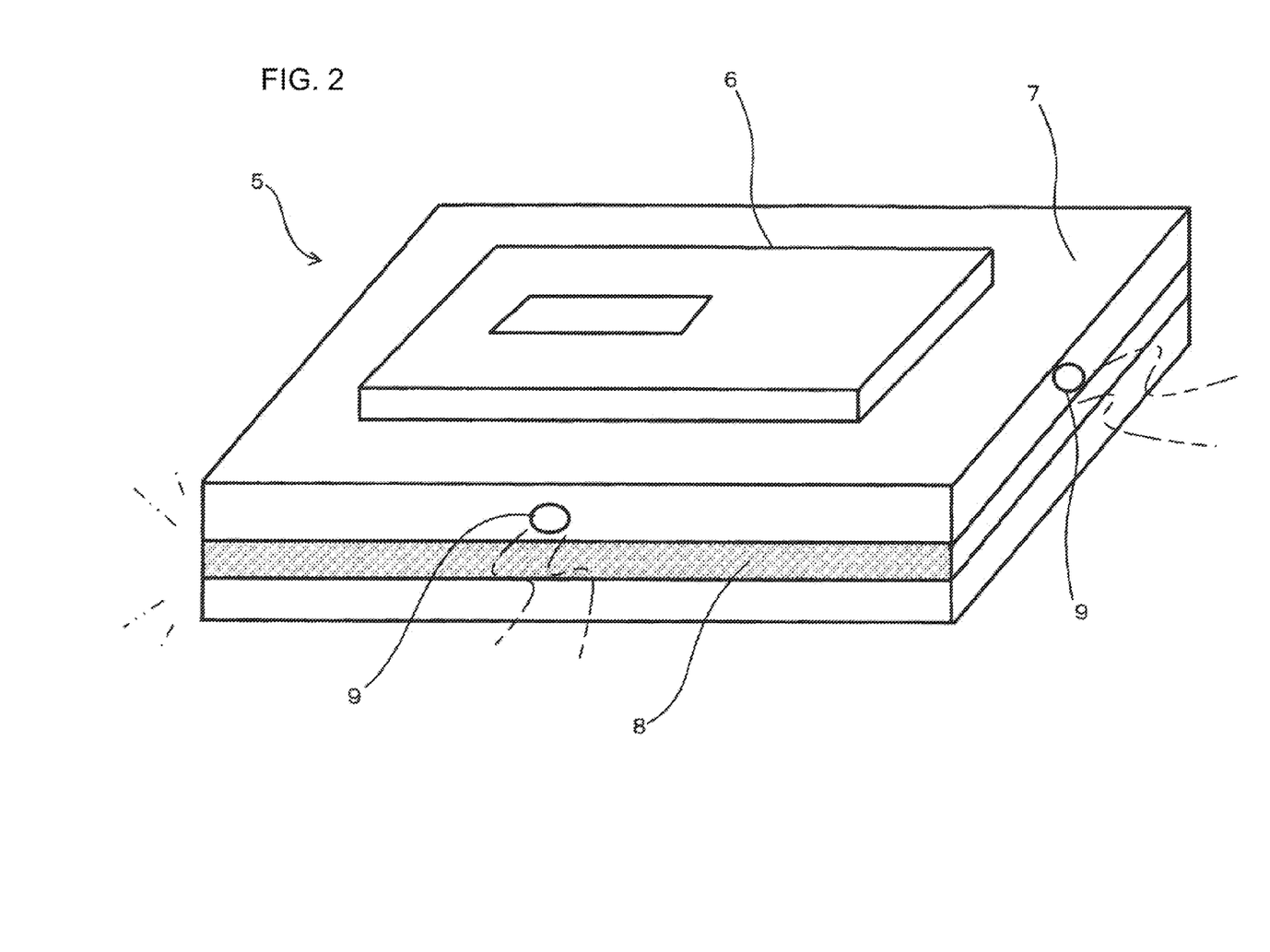
FIG. 2 is a perspective view of the vehicle-mounted charger of the embodiment.

FIG. 2 is a perspective view of the vehicle-mounted charger 5. FIG. 2 shows a state where a mobile phone (an example of the apparatus to be charged) 6 is placed on a mounting surface 7 of the vehicle-mounted charger 5. The vehicle-mounted charger 5 includes an LED 8 functioning as a notification unit 19 (see FIG. 7) which is used for notifying the user that the mobile phone 6 is in the chargeable state, or the like, and an opening 9 through which a sound from a speaker 11 (see FIGS. 3 and 7) disposed in the vehicle-mounted charger 5 is transmitted to the outside.

Figure 3:
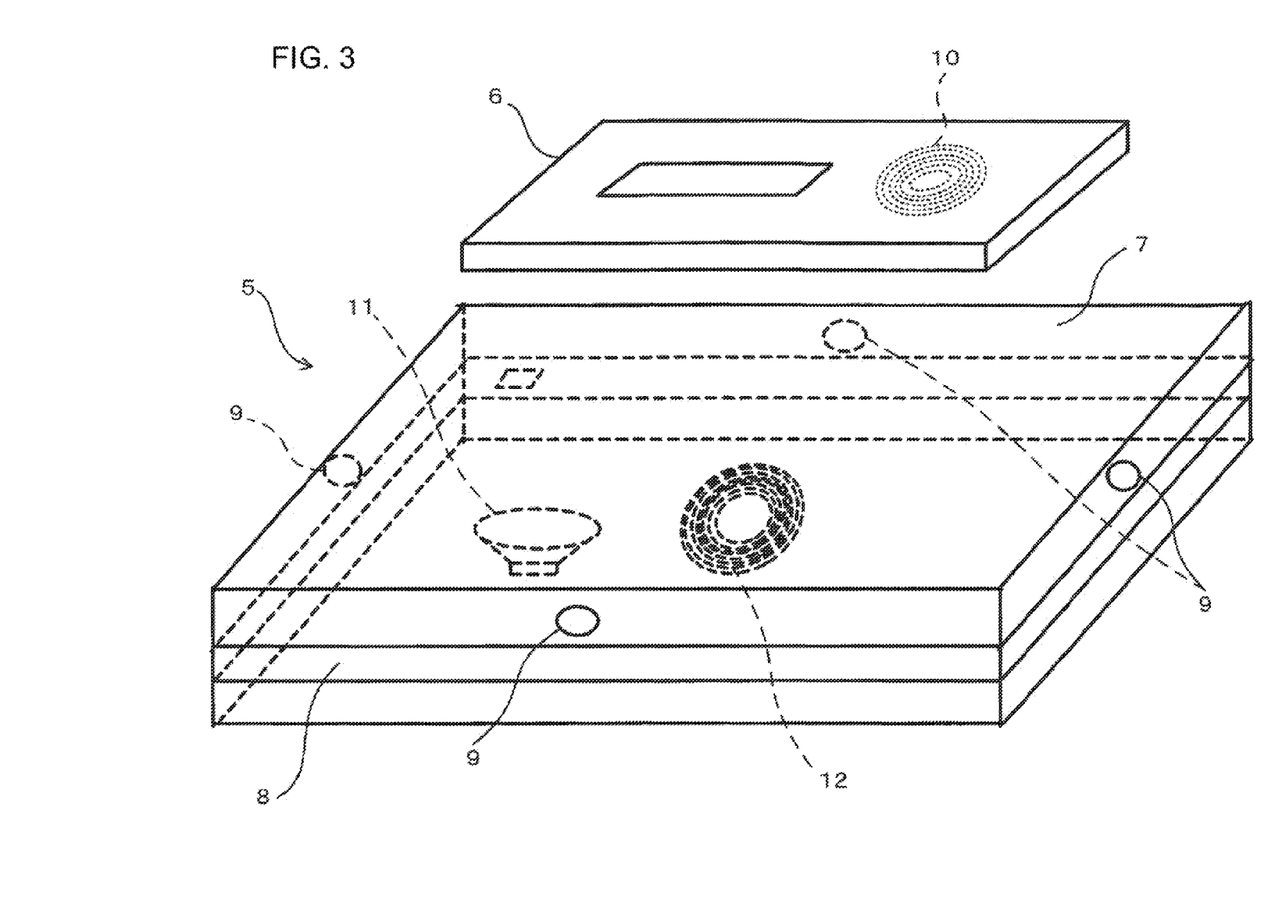
FIG. 3 is a perspective view of the vehicle-mounted charger of the embodiment.
Figure 4:
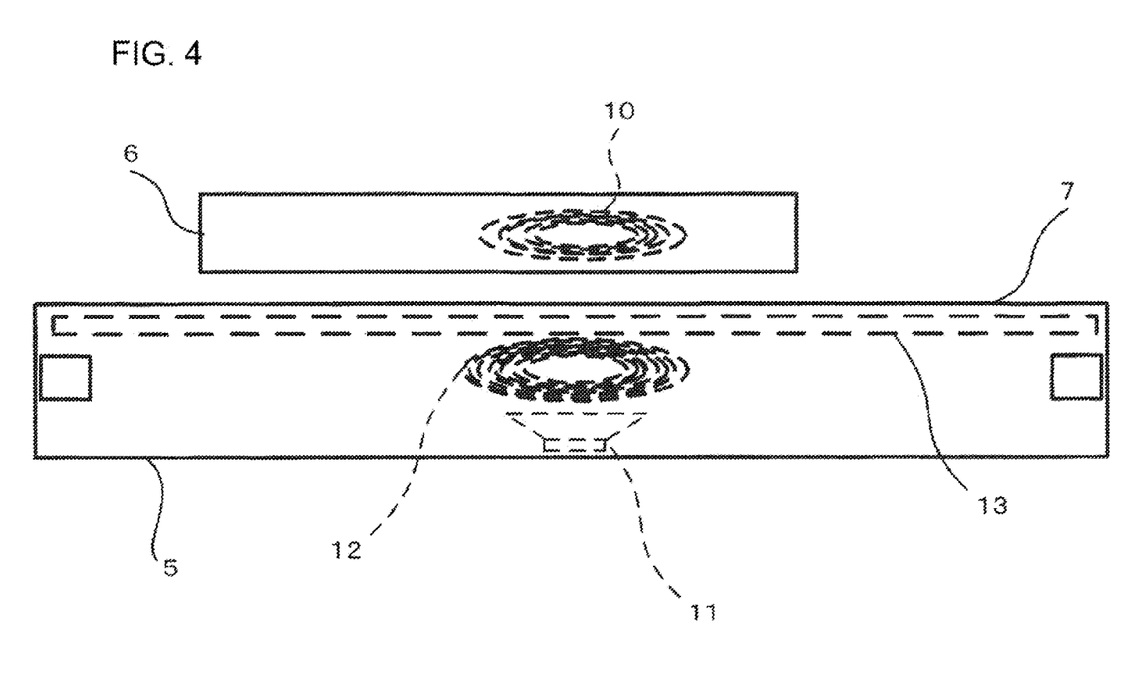
FIG. 4 is a side view of the vehicle-mounted charger of the embodiment.

FIG. 3 is a perspective view of the vehicle-mounted charger 5 in a state where a part of the internal configuration is made transparent. Furthermore, FIG. 4 is a side view of the vehicle-mounted charger 5 in a state where a part of the internal configuration is made transparent. As shown in FIGS. 3 and 4, a primary coil 12 which transmits electric power to a secondary coil 10 that is incorporated in the mobile phone 6, and that is used for receiving the electric power, and the speaker 11 are disposed in the inner side of the mounting surface 7 on which the mobile phone 6 is to be disposed.

In the embodiment, the primary coil 12, and the secondary coil 10 of the mobile phone 6 are opposed to each other, to cause the magnetic fluxes from the primary coil 12 to reach the secondary coil 10 of the mobile phone 6, thereby charging a battery (not shown) provided in the mobile phone 6. The mounting surface 7 is preferably formed by a synthetic resin so that the magnetic fluxes which are directed from the primary coil 12 toward the secondary coil 10 of the mobile phone 6 can pass through the surface.

In the specification, in order to simplify the description, description of a circuit for driving the primary coil 12, an attaching structure, and the like is omitted. The embodiment will be described assuming that the primary coil 12 is stationary, and, when the user moves the mobile phone 6 above the mounting surface 7, the positional alignment between the primary coil 12 and the secondary coil 10 is performed.

Figure 5:
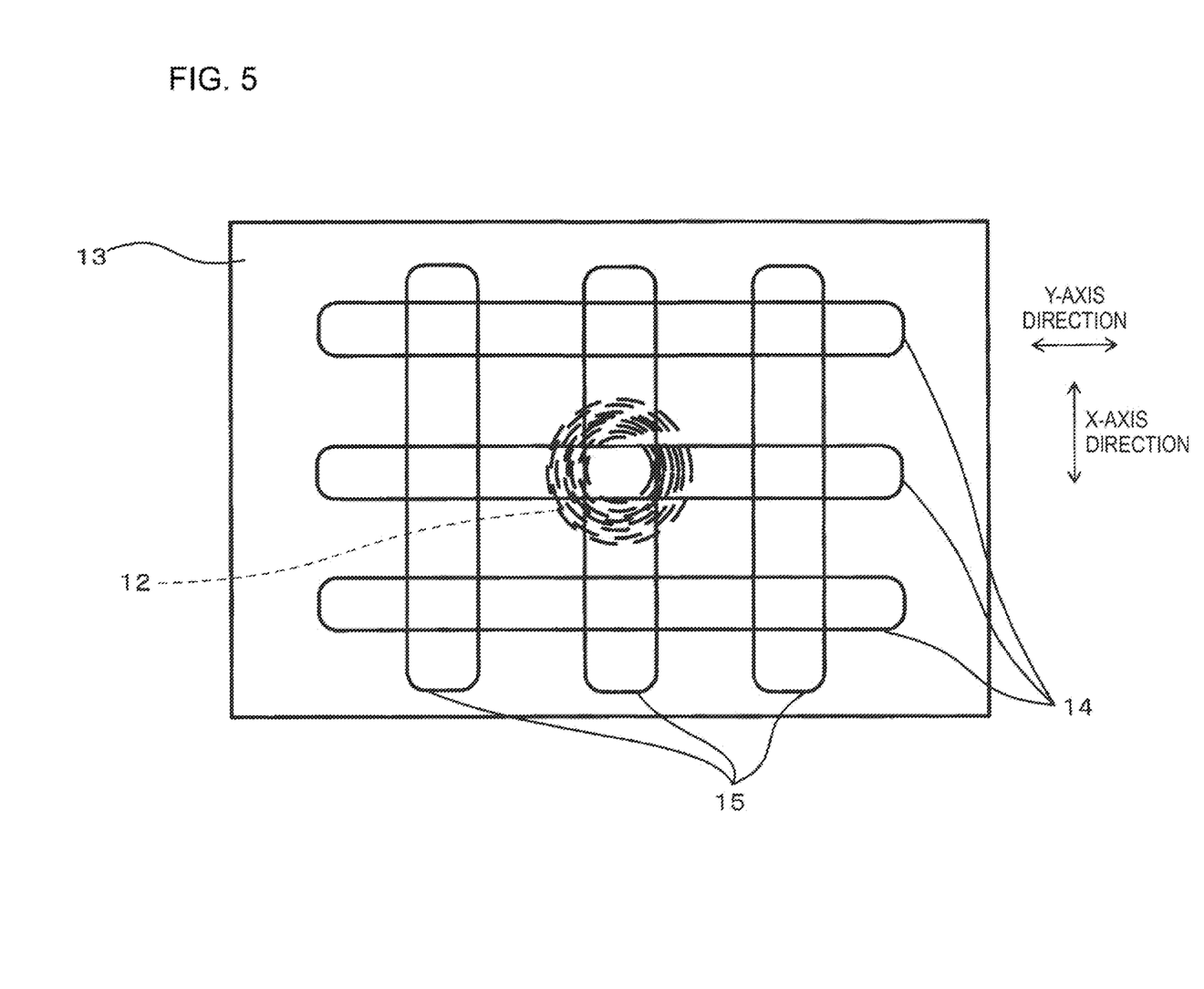
FIG. 5 is a top plan view of a position detection unit in the vehicle-mounted charger of the embodiment.

As shown in FIG. 4, similarly with a prior art literature (for example, JP-A-2009-247194), for example, a position detection unit 13 which detects whether the mobile phone 6 is placed or not, and which roughly detects the position of the mobile phone 6 is placed on the whole surface of the rear surface side of the mounting surface 7. FIG. 5 is a top plan view of the position detection unit 13 in the vehicle-mounted charger 5.

As shown in FIG. 5, for example, the position detection unit 13 includes a plurality of position detecting coils 14 which detect the position in the X-axis direction, and a plurality of position detecting coils 15 which detect the position in the Y-axis direction. Each of the position detecting coils has a thin loop-like shape which is elongated in the X- or Y-axis direction. The plurality of position detecting coils 14 are placed at predetermined intervals in the X-axis direction. The plurality of position detecting coils 15 are placed at predetermined intervals in the Y-axis direction.

When a pulse signal 16 is input from a pulse source which is not shown, in the position detecting coils at predetermined timings, the position detecting coils in which the pulse signal 16 is input excite the secondary coil 10 of the mobile phone 6. At this time, an echo signal 17 which is produced by the energy of a current that flows through the excited secondary coil 10 acts on the above-described position detecting coils which excite the secondary coil 10.

Figure 6:
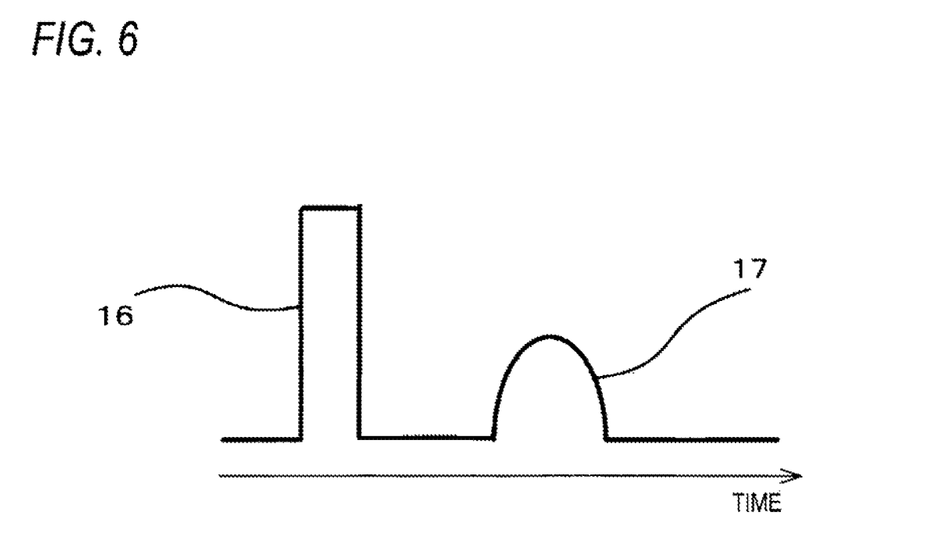
FIG. 6 is a view showing pulse and echo signals which are input to the position detection unit in the vehicle-mounted charger of the embodiment.

In a position detecting coil which is in the vicinity of the secondary coil 10, after the pulse signal 16 is input, therefore, the echo signal 17 from the secondary coil 10 is induced with a delay of a predetermined time as shown in FIG. 6. Consequently, the position detection unit 13 can determine to which one of the plurality of position detecting coils 14 or to which one of the plurality of position detecting coils 15 the secondary coil 10 approaches.

Figure 7:
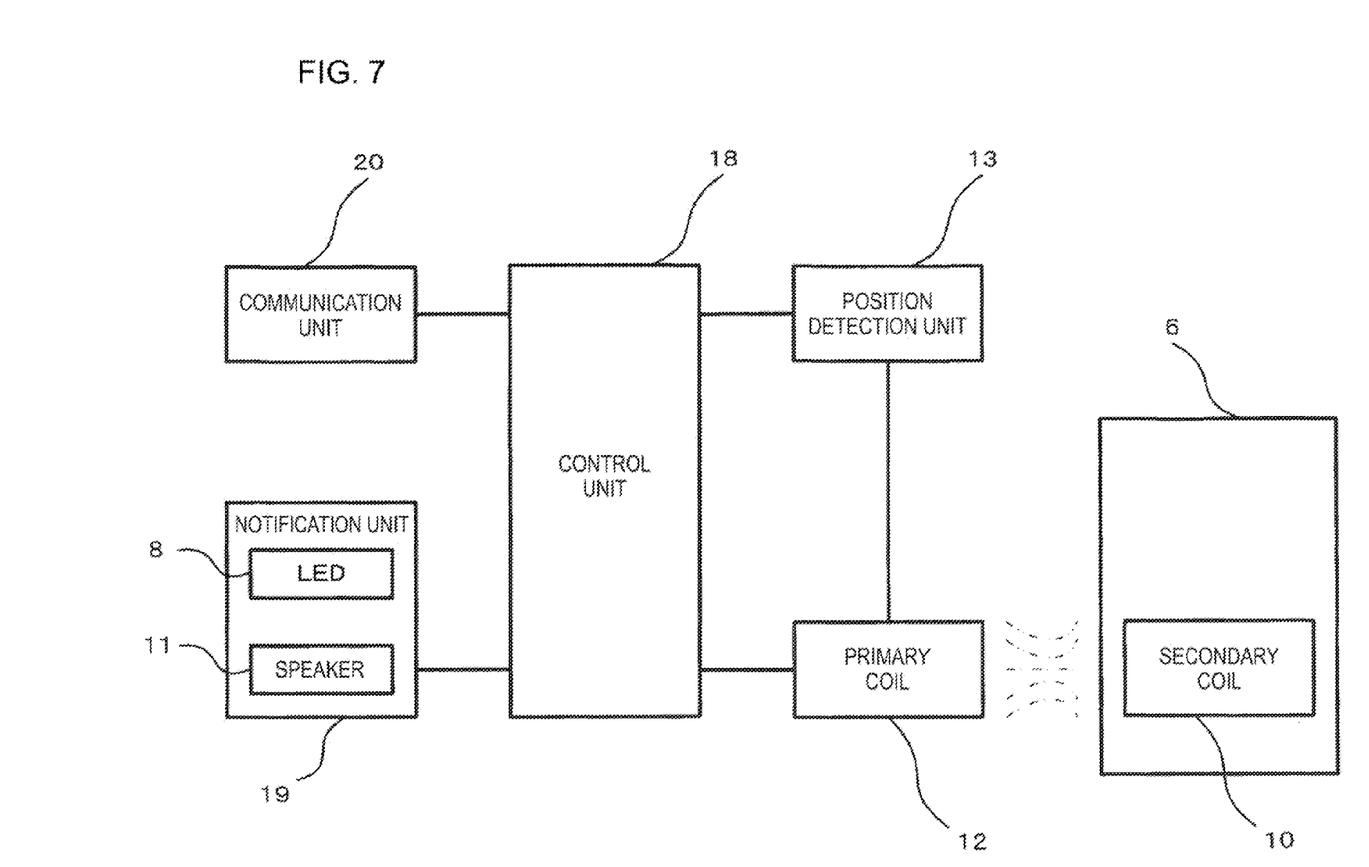
FIG. 7 is a block diagram showing relationships between the internal configuration of the vehicle-mounted charger of the embodiment, and a mobile phone which is to be charged.

FIG. 7 is a block diagram showing relationships between the internal configuration of the vehicle-mounted charger 5, and the mobile phone 6 which is to be charged. As shown in FIG. 7, the vehicle-mounted charger 5 includes a control unit 18, the position detection unit 13, a notification unit 19, a communication unit 20, and the primary coil 12. The control unit 18 controls energization of the primary coil 12. The position detection unit 13 detects the positional relationship between the primary coil 12 and the secondary coil 10 of the mobile phone 6. The notification unit 19 performs notification to the user. The notification unit 19 has the LED 8 shown in FIG. 2, and the speaker 11 shown in FIG. 3. The communication unit 20 communicates with the vehicle-mounted electronic apparatus 4, and which is disposed in the vehicle 1 shown in FIG. 1.

Moreover, the control unit 18 acquires the positional relationship which is detected by the position detection unit 13, and which is established between the primary coil 12 and the secondary coil 10, and controls the notification unit 19 so as to notify of the positional relationship. The communication unit 20 communicates with the vehicle-mounted electronic apparatus 4 to acquire vehicle state information indicating whether the primary coil 12 is in an energizable state or not. This is performed because the energization of the primary coil 12 enhances the reliability of the vehicle control.

Figure 8:
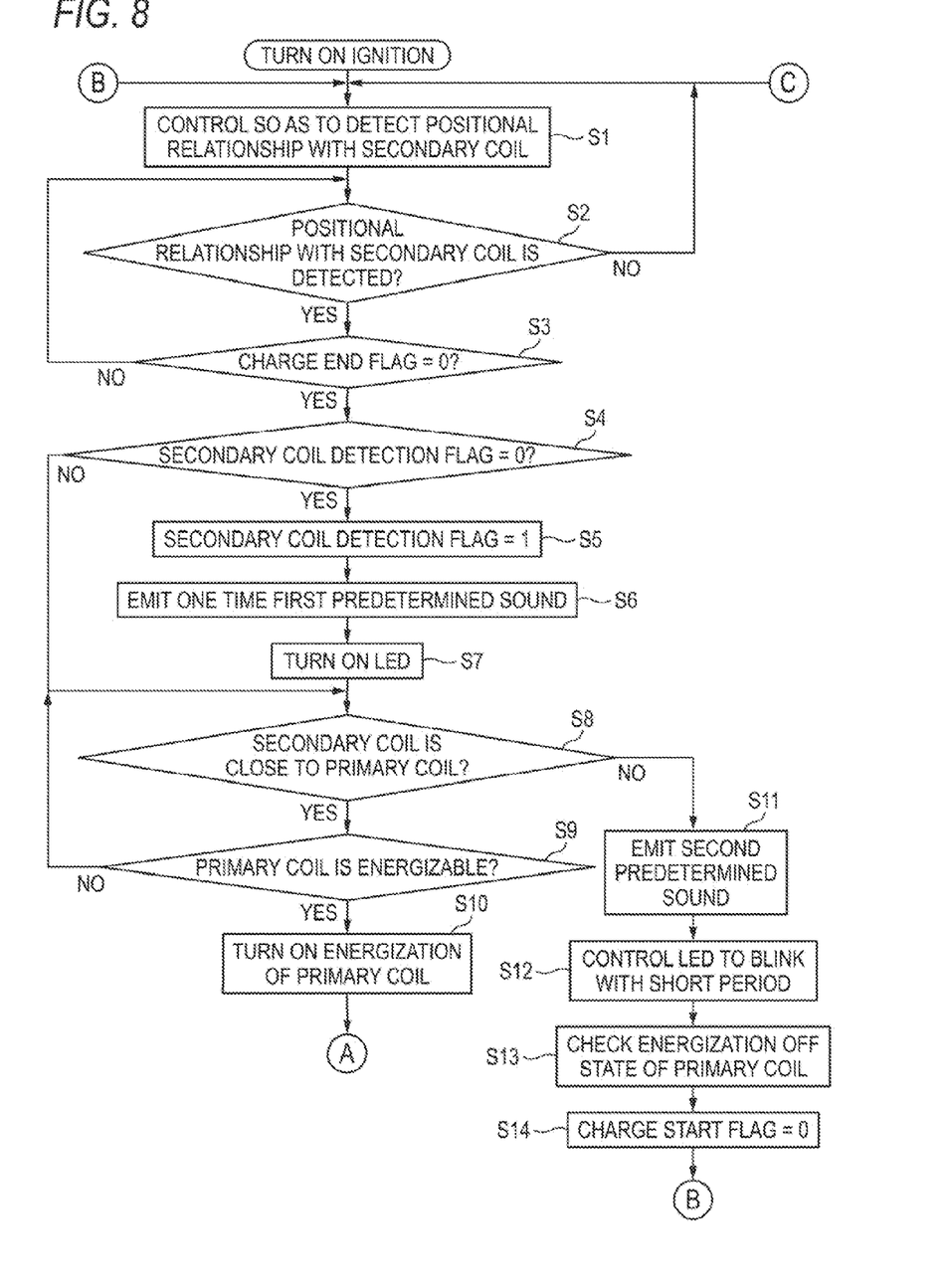
FIG. 8 is a flowchart showing the operation of the vehicle-mounted charger of the embodiment.
Figure 9:
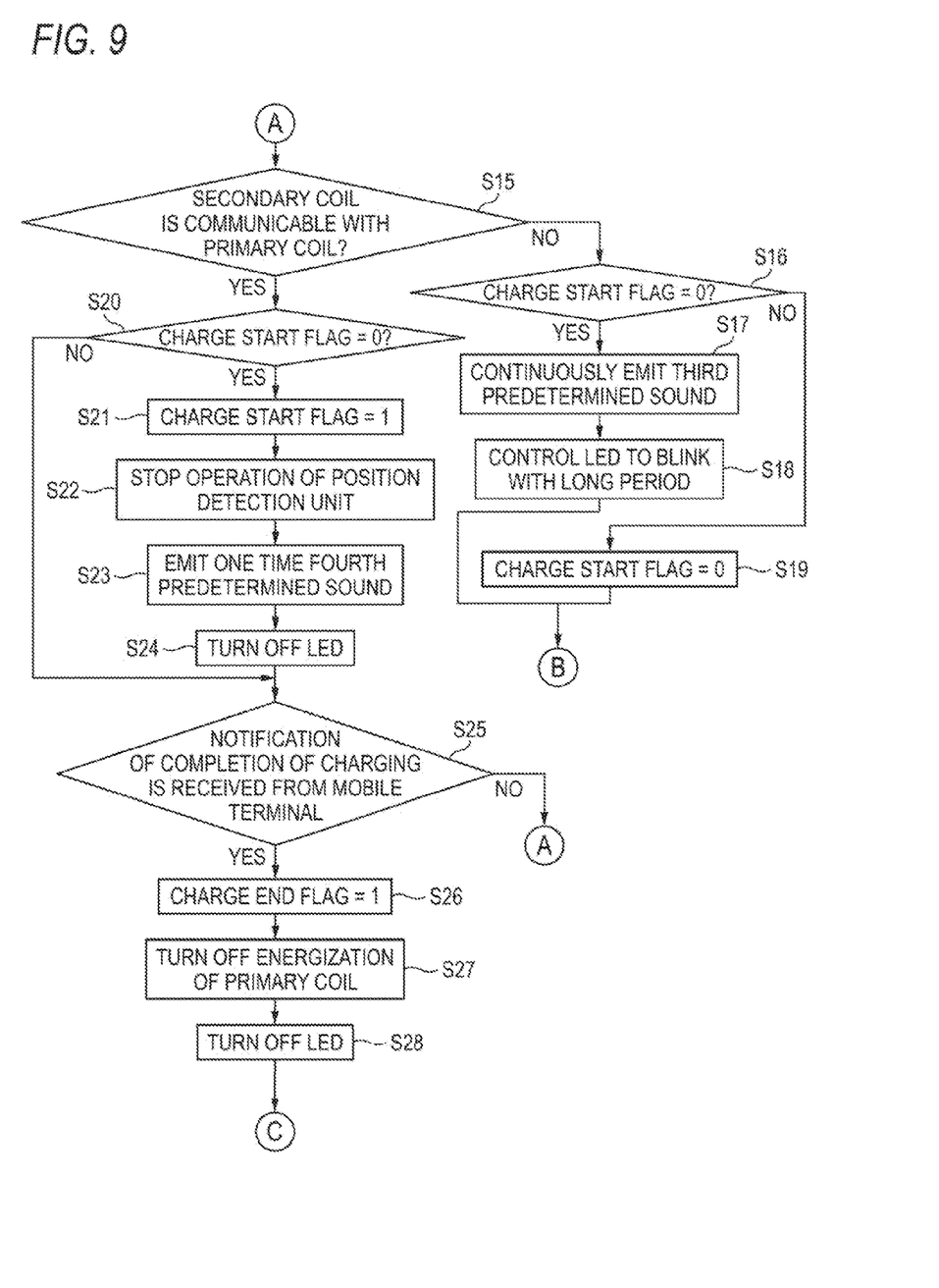
FIG. 9 is a flowchart showing the operation of the vehicle-mounted charger of the embodiment.
Figure 10:
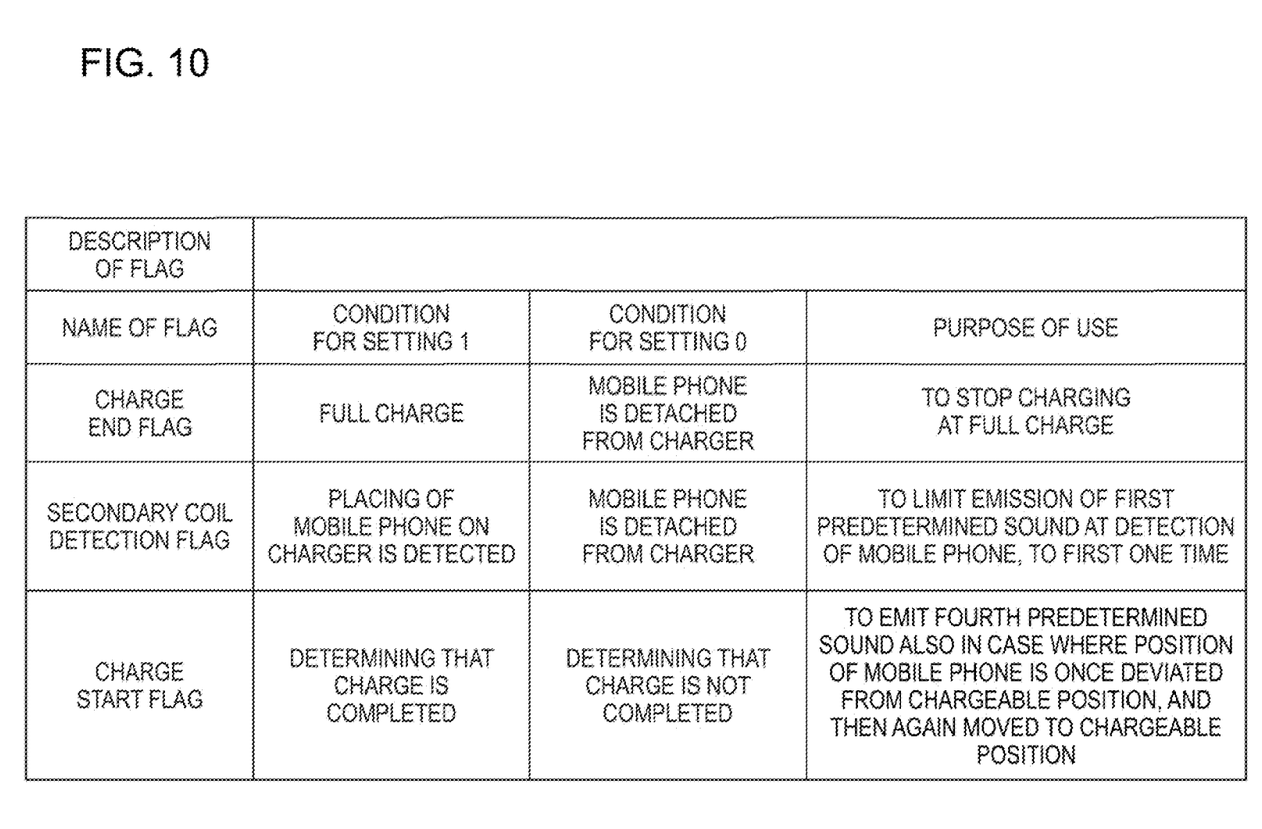
FIG. 10 is a view illustrating flags which are used in the vehicle-mounted charger of the embodiment.

Referring to FIGS. 8, 9, and 10, hereinafter, the procedure of placing the mobile phone 6 on the mounting surface 7 of the vehicle-mounted charger 5, and starting charging of the mobile phone 6 will be described. FIGS. 8 and 9 are flowcharts showing the operation of the vehicle-mounted charger 5. FIG. 10 is a view illustrating flags which are used in the vehicle-mounted charger 5.

When the ignition switch of the vehicle 1 is turned ON, first, the control unit 18 controls the position detection unit 13 so as to detect the positional relationship between the primary coil 12 and the secondary coil 10 of the mobile phone 6 (step S1). At this time, the flags shown in FIG. 10 are set to "Charge end flag: 0, Secondary coil detection flag: 0, and Charge start flag: 0". Moreover, the energization of the primary coil 12 is in the OFF state, and the notification unit 19 does not notify of anything.

If the position detection unit 13 detects the positional relationship between the primary coil 12 and the secondary coil 10 (step S2: Yes), the control unit 18 checks whether the charge end flag is 0 or not (step S3). If the charge end flag=0, the process proceeds to step S4, and, if the charge end flag=1, the process returns to step S2. In step S4, the control unit 18 checks whether the secondary coil detection flag is 0 or not. If the secondary coil detection flag=0, the process proceeds to step S5, and, if the secondary coil detection flag=1, the process proceeds to step S8. In step S5, the control unit 18 sets the secondary coil detection flag=1. Next, the control unit 18 causes the speaker 11 of the notification unit 19 to emit one time a first predetermined sound (step S6), and turns ON the LED 8 of the notification unit 19 (step S7).

In step S8, the control unit 18 acquires the positional relationship between the primary coil 12 and the secondary coil 10, from the position detection unit 13, and determines whether the secondary coil 10 is close to the primary coil 12 or away from the primary coil 12. If it is determined that the secondary coil 10 is close to the primary coil 12 (step S8: Yes), the process proceeds to step S9, and, if it is determined that the secondary coil 10 is away from the primary coil 12 (step S8: No), the process proceeds to step S11.

In step S9, the control unit 18 inquires of the vehicle-mounted electronic apparatus 4 through the communication unit 20 whether the primary coil 12 is energizable or not. If it is determined that the primary coil is energizable, based on the vehicle state information obtained in the communication unit 20, the process proceeds to step S10, and, if it is determined that the primary coil is not energizable, the process returns to step S8. In step S10, the control unit 18 starts the energization of the primary coil 12.

On the other hand, in step S11, the control unit 18 causes the speaker 11 to emit a second predetermined sound which is different from the first predetermined sound(, in order to notify the user that the secondary coil 10 is away from the primary coil 12. Furthermore, the control unit 18 causes the LED 8 to blink with a short period (step S12). The sound output in step S11 and the light blinking in step S12 can lead the user to move the mobile phone 6 to a chargeable position on the mounting surface 7.

Thereafter, the control unit 18 checks the energization OFF state of the primary coil 12 (step S13), sets the charge start flag to 0 (step S14), and returns to step S1. This can guide the user's operation so as to move the mobile phone 6 to the chargeable position on the mounting surface 7, i.e., to attain a state where the secondary coil 10 and the primary coil 12 are sufficiently close to each other.

Next, a process which is performed after step S10 and between the start and end of charging will be described.

The control unit 18 determines whether the secondary coil 10 and the primary coil 12 are communicatable with each other or not (step S15). If communicatable (step S15: Yes), the process proceeds to step S20, and, if not communicatable (step S15: No), the process proceeds to step S16. The procedure subsequent to step S16 is a process of again requesting the user to perform the positional alignment as a back-up in the case where the positional alignment of the secondary coil 10 and the primary coil 12 is insufficiently performed.

In step S16, the control unit 18 checks whether the charge start flag is 0 or not. If the charge start flag=0 (step S16: Yes), the process proceeds to step S17, and, if the charge start flag=1 (step S16: No), the process proceeds to step S19. In step S19, the control unit 18 sets the charge start flag to 0, and the process returns to step S1. By contrast, in step S17, the control unit 18 causes a third predetermined sound which is different from the first and second predetermined sounds. to be continuously emitted. Furthermore, the control unit 18 causes the LED 8 to blink with a long period (step S18), and the process returns to step S1.

The control unit 18 in which the process proceeds to step S20 after it is determined in step S15 that the secondary coil 10 and the primary coil 12 are communicatable with each other (step S15: Yes) checks whether the charge start flag is 0 or not. If the charge start flag=0 (step S20: Yes), the process proceeds to step S21, and, if the charge start flag=1 (step S20: No), the process proceeds to step S25. In step S21, the control unit 18 sets the charge start flag to 1, and starts the charging operation. Next, the control unit 18 stops the operation of the position detection unit 13 (step S22), causes the speaker 11 to emit one time a fourth predetermined sound which is different from the first, second, and third predetermined sounds (step S23), and turns OFF the LED 8 (step S24).

In step S25, the control unit 18 determines whether notification of completion of charging is received from the mobile phone 6 or not. If the notification of completion of charging is received (step S25: Yes), the process proceeds to step S26, and, if the notification of completion of charging is not received, the process returns to step S15. In step S26, the control unit 18 sets the charge end flag to 1. Next, the control unit 18 turns OFF the energization of the primary coil 12 (step S27), turns OFF the LED 8 (step S26), and returns to step S1.

As described above, the vehicle-mounted charger 5 of the embodiment includes: the control unit 18 which controls energization of the primary coil 12; the position detection unit 13 which detects the positional relationship between the primary coil 12 and the secondary coil 10 of the mobile phone 6; and the notification unit 19 which performs notification to the user, and, in the state where the energization of the primary coil 12 is not performed, the control unit 18 acquires the positional relationship between the primary coil 12 and the secondary coil 10, the positional relationship being detected by the position detection unit 13, and controls the notification unit 19 to notify of the positional relationship. Therefore, the vehicle-mounted charger 5 is very excellent in usability.

Even when the keyless entry control is conducted just after the user gets into the vehicle 1, namely, the positional alignment between the primary coil 12 and the secondary coil 10 can be performed. As soon as the user gets into the vehicle 1, therefore, the charger can prepare for an operation of charging the mobile phone 6 which is placed at the position where the charging operation is enabled. When the influence on the vehicle control is then eliminated and a chargeable state is attained, the vehicle-mounted charger 5 can immediately start the charging operation. Therefore, the vehicle-mounted charger 5 is very excellent in usability.

Although the invention has been described in detail and with reference to the specific embodiment, it is obvious to a person skilled in the art that various changes and modifications can be made without departing from the spirit and scope of the invention.

The application is based on Japanese Patent Application (No. 2011-267954) filed on Dec. 7, 2011, and the contents of which are incorporated herein by reference.

An embodiment of the vehicle-mounted charger of the invention includes: the control unit which controls energization of the primary coil; the position detection unit which detects the positional relationship between the primary coil and the secondary coil of the apparatus to be charged; and the notification unit which performs notification to the user, and the control unit acquires positional relationship between the primary coil and the secondary coil in the state where the energization of the primary coil is not performed, the positional relationship being detected by the position detection unit, and controls the notification unit to notify of the positional relationship. Therefore, the vehicle-mounted charger is very excellent in usability.

Even when the keyless entry control is conducted just after the user gets into a vehicle, namely, the positional alignment between the primary coil and the secondary coil can be performed. As soon as the user gets into the vehicle, therefore, the charger can prepare for an operation of charging the apparatus to be charged which is placed at a position where the charging operation is enabled. When the influence on the vehicle control is then eliminated and a chargeable state is attained, the vehicle-mounted charger can immediately start the charging operation. Therefore, the vehicle-mounted charger is very excellent in usability. Consequently, the vehicle-mounted charger is expected to be used as a vehicle-mounted electronic apparatus.

REFERENCE SIGNS LIST 1 vehicle
2 interior
3 steering wheel
4 vehicle-mounted electronic apparatus
5 vehicle-mounted charger
6 mobile phone
7 mounting surface
8 LED
9 opening
10 secondary coil
11 speaker
12 primary coil
13 position detection unit
14, 15 position detecting coil
16 pulse signal
17 echo signal
18 control unit
19 notification unit
20 communication unit

The invention claimed is:

1. A vehicle-mounted charger which performs wireless charging, the vehicle-mounted charger comprising:
a control unit which controls energization of a primary coil;
a position detection unit which detects a positional relationship between the primary coil and a secondary coil of an apparatus to be charged; and
a notification unit which performs notification to a user,
wherein in a state where the energization of the primary coil is not performed, the control unit acquires the positional relationship between the primary coil and the secondary coil which is detected by the position detection unit, and controls the notification unit to notify of the positional relationship.

2. The vehicle-mounted charger according to claim 1, wherein the position detection unit has a plurality of position detecting coils which are placed on an upper surface of the primary coil.

3. The vehicle-mounted charger according to claim 1, wherein in a state where the primary coil and the secondary coil are sufficiently close to each other, the control unit causes the notification unit to perform primary notification, and starts the energization of the primary coil, and, when communication between the primary coil and the secondary coil is enabled, the control unit causes the notification unit to perform secondary notification which is different in notification content from the primary notification.

4. The vehicle-mounted charger according to claim 3, further comprising:
a communication unit which communicates with a vehicle on which the vehicle-mounted charger is mounted,
wherein in accordance with a state of the vehicle which is obtained through the communication unit, the control unit starts the energization of the primary coil.

* * * * *